United States Patent

[11] 3,633,853

[72] Inventor Roy T. J. Collins
 Ferndown, England
[21] Appl. No. 51,581
[22] Filed July 1, 1970
[45] Patented Jan. 11, 1972
[73] Assignee British Aircraft Corporation Limited
 London, England
[32] Priority July 1, 1969
[33] Great Britain
[31] 33,130/69

[54] ESCAPE DEVICES FOR AIRCRAFT
 5 Claims, 14 Drawing Figs.
[52] U.S. Cl. .................................................. 244/137 P,
 182/48, 193/25 B
[51] Int. Cl. ...................................................... B64d 28/14
[50] Field of Search ............................................ 244/137,
 118, 129 D, 129 S; 182/48, 49; 193/22, 25

[56] References Cited
UNITED STATES PATENTS
2,765,131 10/1956 Boyle .......................... 244/137 P
2,901,055 8/1959 Fairchilds et al. ............ 244/137 P
3,018,867 1/1962 Heyniger ...................... 244/137 P Primary Examiner—Milton Buchler
Assistant Examiner—Steven W. Weinrieb
Attorney—Sughrue, Rothwell, Mion, Zinn & Macpeak ABSTRACT: An aircraft having an external door carried by a parallel linkage includes an escape slide stowed in a container secured to a carriage which is movable relatively to the door on a support also carried by the parallel linkage, the carriage being so constrained that, as the door opens, the carriage moves through the door opening and then to one side.

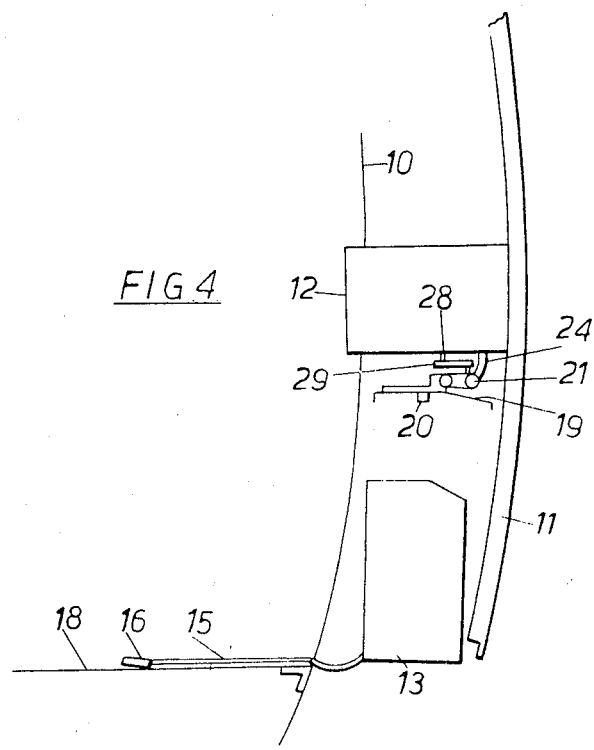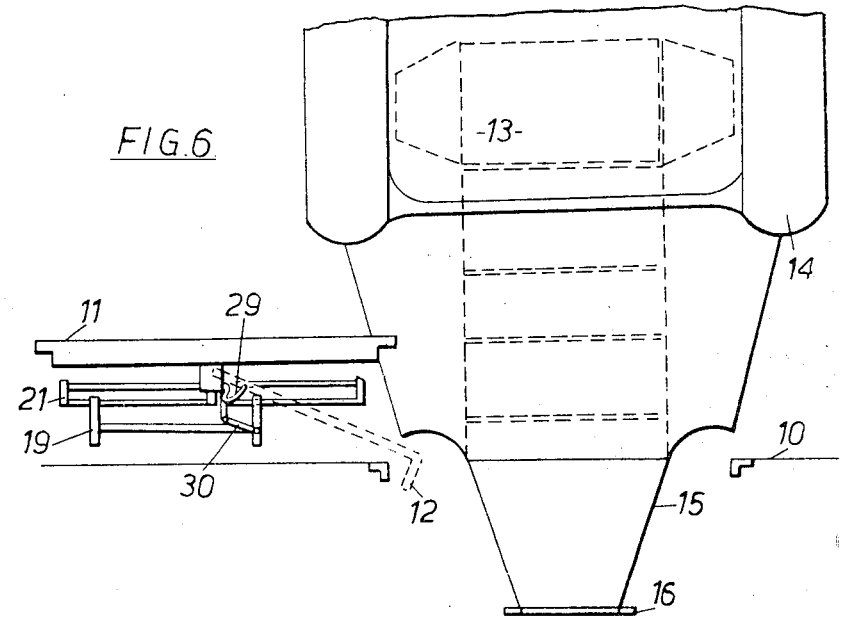

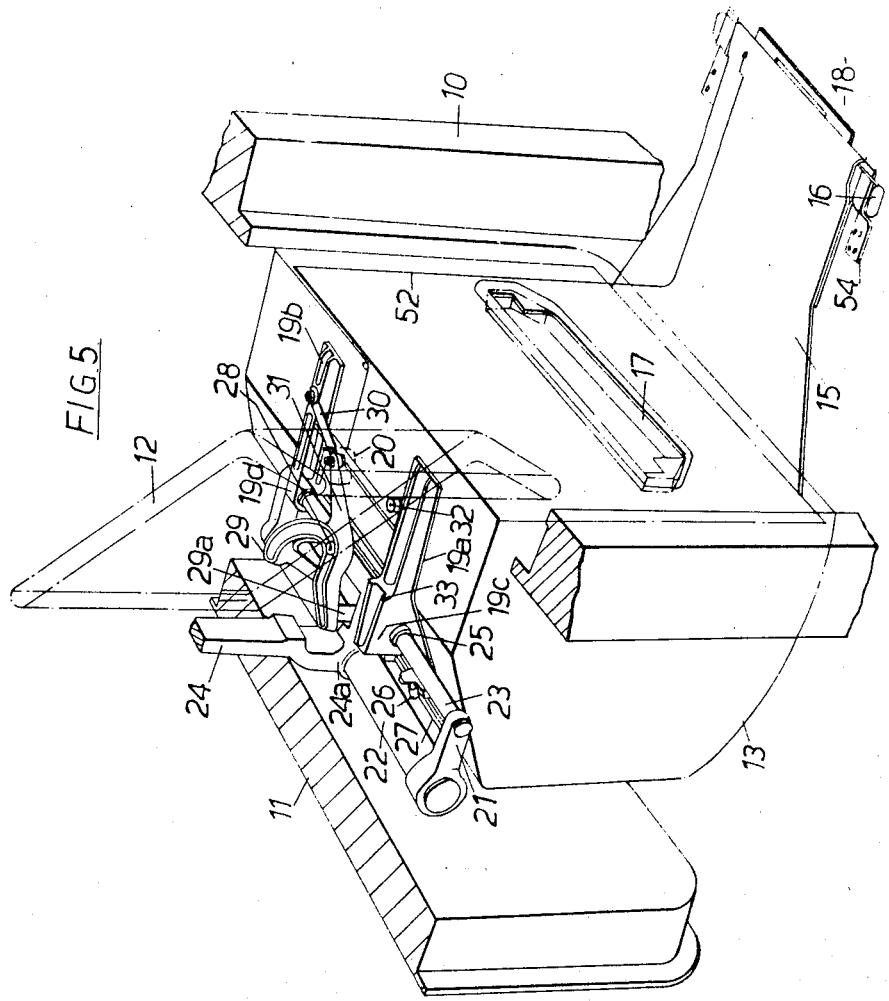

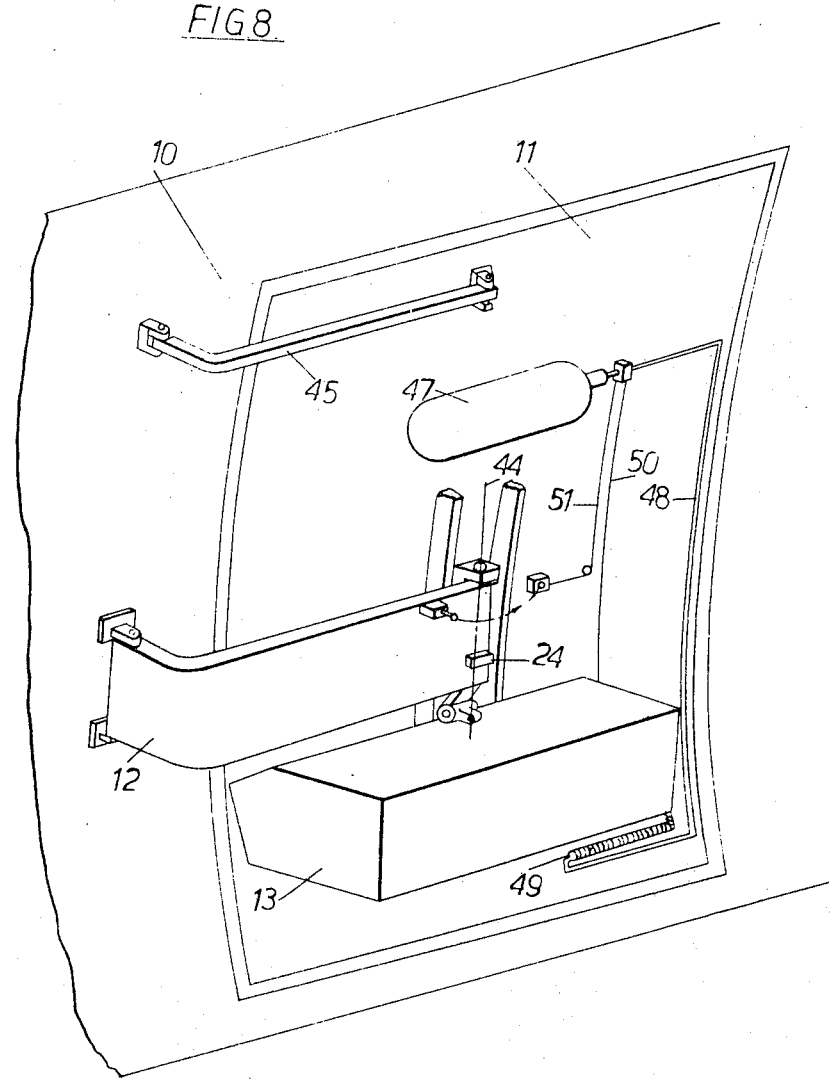

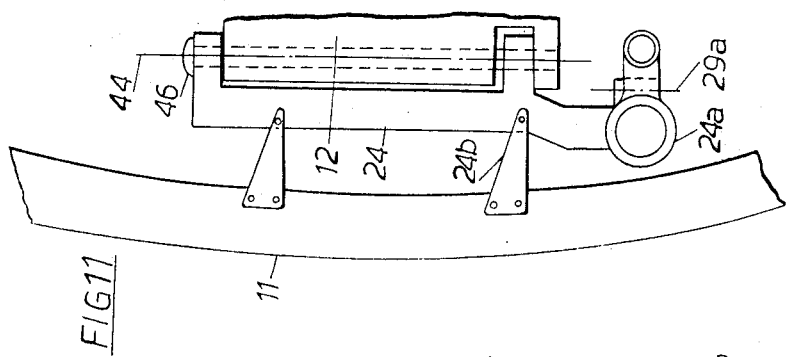
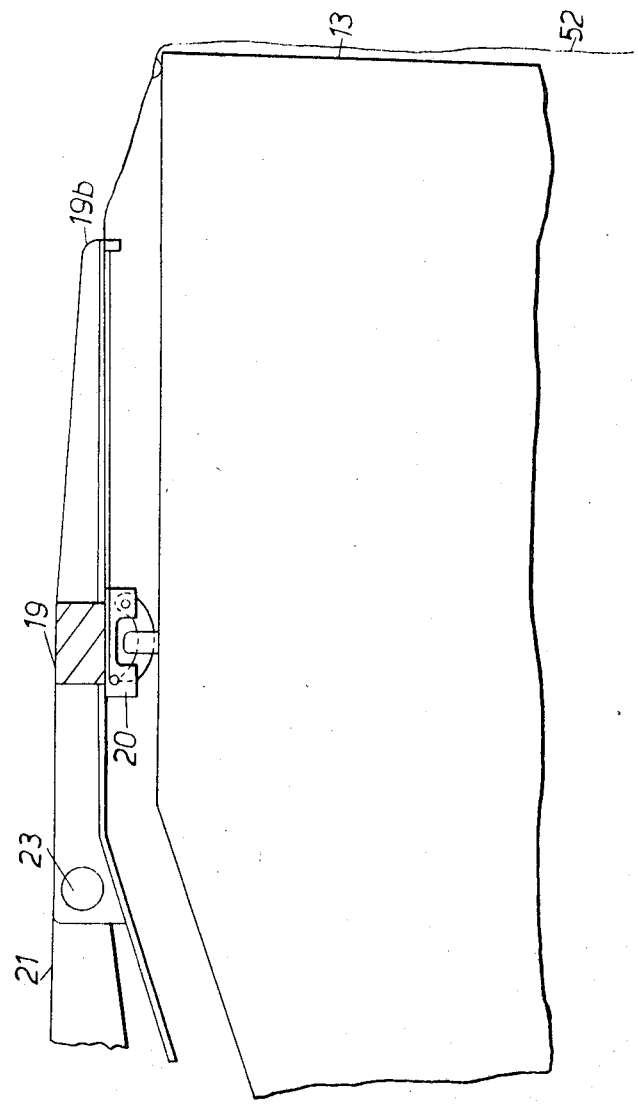

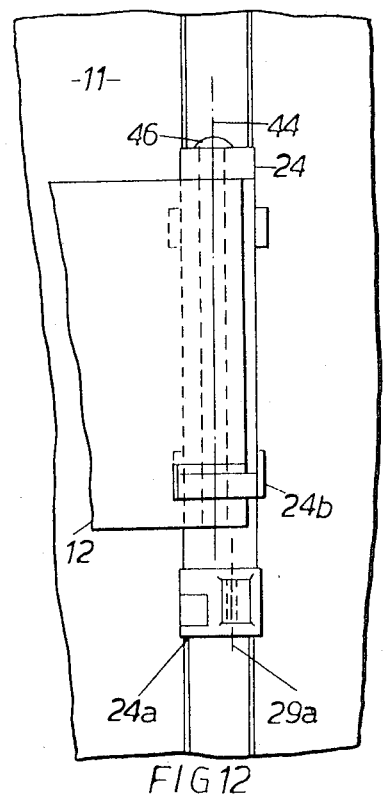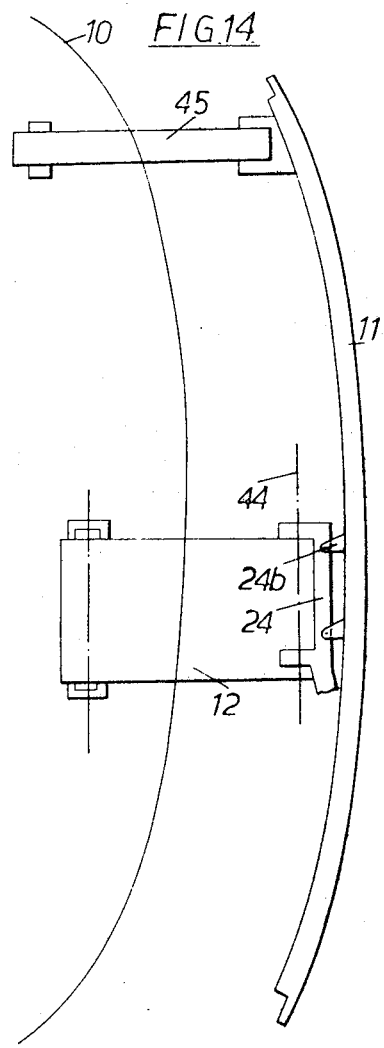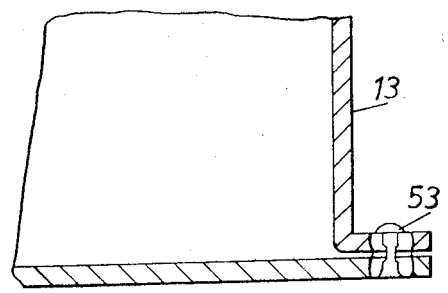

ESCAPE DEVICES FOR AIRCRAFT

It is desirable in aircraft to provide escape devices by which passengers and crew can leave the aircraft rapidly and safely in an emergency. This invention is concerned with provision of escape devices in aircraft including an external door of a particular type, namely an external door carried by a parallel linkage, whereby the door can move bodily relatively to a door aperture, outwards and to one side from closed position to open position, and vice versa. The use of doors carried by a parallel linkage is especially advantageous in aircraft in which the fuselage is of fairly small diameter as is the case in aircraft designed for supersonic flight.

It is desirable that an escape device should deploy itself entirely automatically upon opening an aircraft door in an emergency, but of course there must be provision for rendering the escape device inoperative when the door is to be opened for ordinary unloading or loading.

According to the present invention an aircraft having an external door carried by a parallel linkage as described above includes a support also carried by the parallel linkage, a carriage movable on the support, a container secured to the carriage, an escape slide stowed within the container and having an end with means for detachable anchorage adjacent to the sill of the door aperture, and means constraining the carriage relatively to the door, whereby when the door is closed the container lies adjacent to the interior of the door, and during the first part of each opening movement of the door the carriage is so shifted on the support that the container remains in register with the door aperture as it moves through the aperture, and during a second part of each opening movement of the door the carriage is shifted in a reverse direction on the support.

In use, after the door has been closed before a flight, the end of the slide is anchored adjacent to the sill. The slide is thus prepared for an emergency, and if the door is opened, then the consequence is that the slide is deployed during the first part of the opening movement of the door, and at the conclusion of the second part of the opening movement the door aperture is free of obstruction so that passengers and crew may leave the aircraft rapidly using the slide.

When the door is to be opened at the conclusion of a flight free of emergency, then the end of the slide is detached from the anchorage, and then the door is opened. The slide remains in the container, and at the conclusion of the opening movement of the door the container is clear of the door aperture, so that the usual exit stairs of gangway can be brought up to the aperture. When the door is next closed, the only step necessary to prepare the slide is to anchor its end.

One example of an aircraft with an escape slide arranged in accordance with the invention will now be described in more detail, with reference to the accompanying drawings. In this example, the escape device is in fact an inflatable slide/life raft. In the drawings:

FIG. 4 is an end elevation, viewed from arrow IV on FIG. 2;

FIG. 5 is a perspective view of the door in the half-open position, just prior to container detachment, the girt bar being shown in the "prepared" position;

FIG. 6 is a plan view of the door in the fully opened position with the slide/life raft fully inflated;

FIG. 8 is a perspective view of the door mounting;

FIGS. 10, 11, 12 and 13 are views of details; and

FIG. 14 is a diagrammatic view of the door mounting, looking aft.

Figure 1:
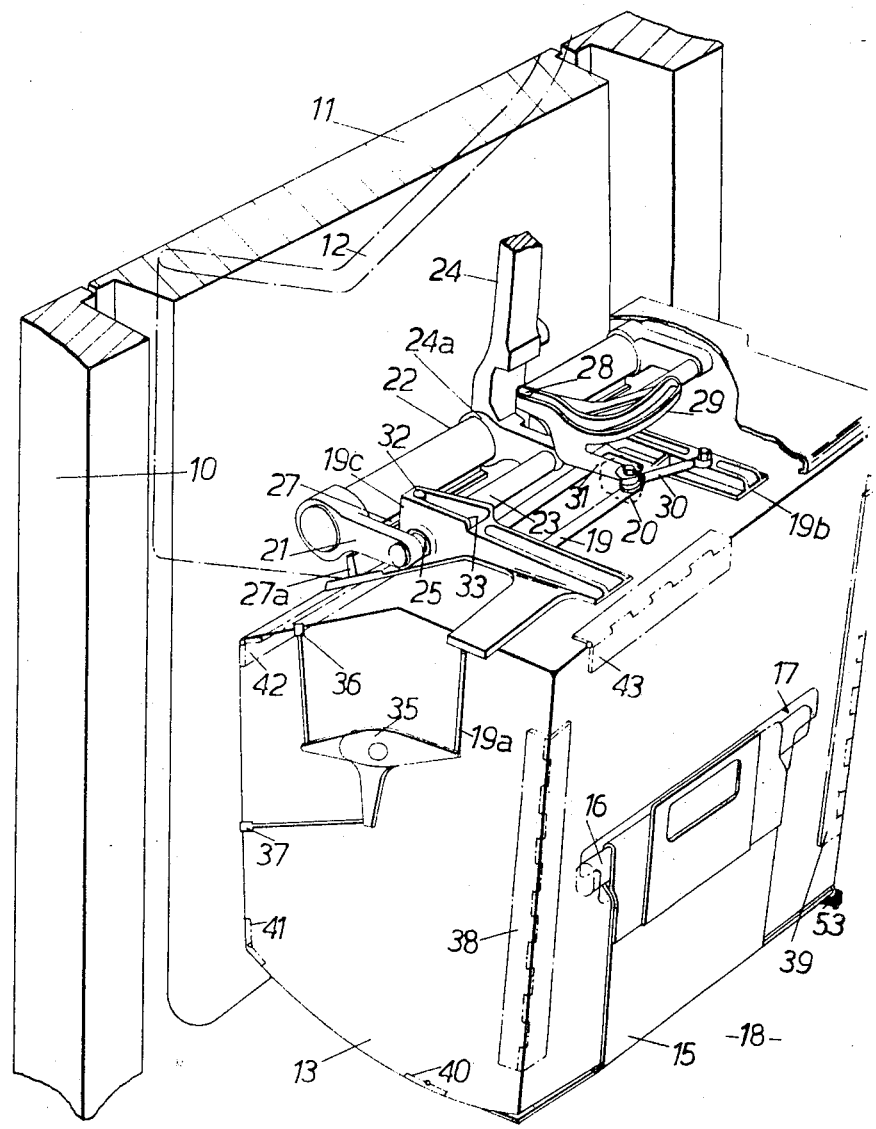
FIG. 1 is a perspective internal view of the lower part of the door in the closed position, a girt bar being shown in the inoperative condition.
Figure 2:
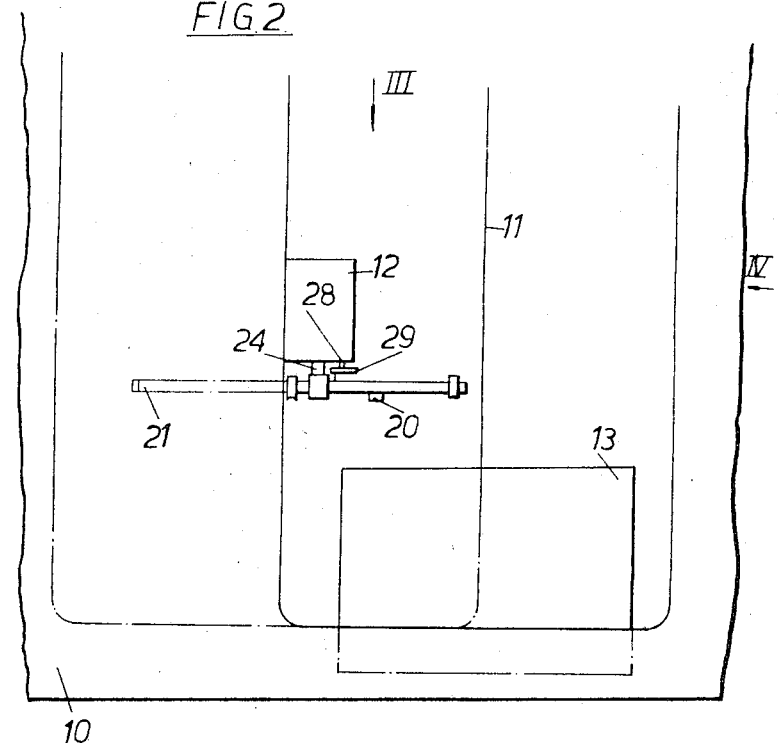
FIG. 2 is an internal elevation of part of the door in the half-open position, the container having just been released from the carriage.

The aircraft has a fuselage which includes door surround structure 10 defining a door opening, and a door 11 mounted on the structure by a deep hinge arm 12. A parallel link 45 (FIG. 14) extending between the top of the door surround structure and the door keeps the latter parallel to the fuselage wall when being opened. On the interior surface of the door 11 is mounted a container 13 enclosing a folded inflatable slide/life raft 14.

Figure 7:
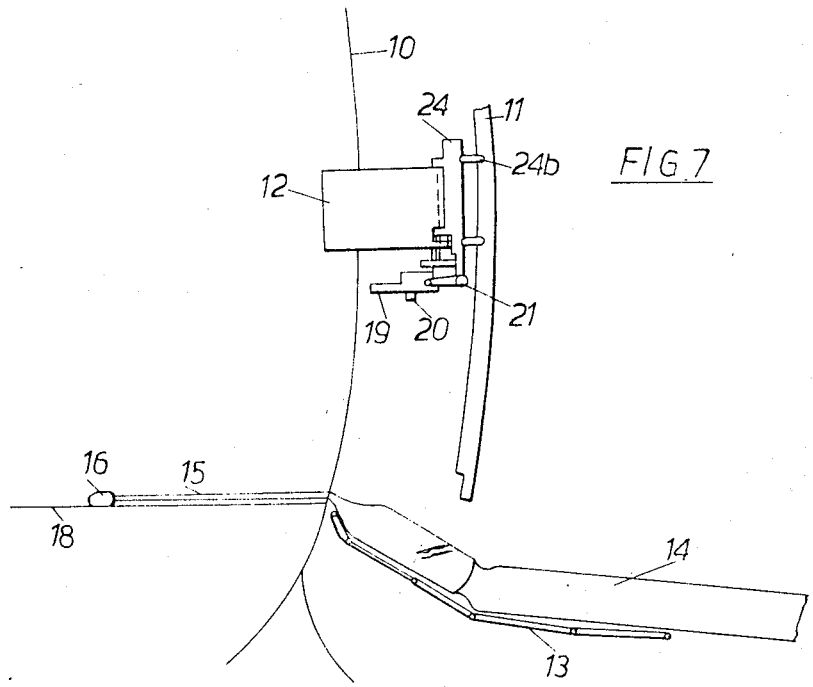
FIG. 7 is an end elevation of the door in the fully open position with the slide/life raft fully inflated.
Figure 9:
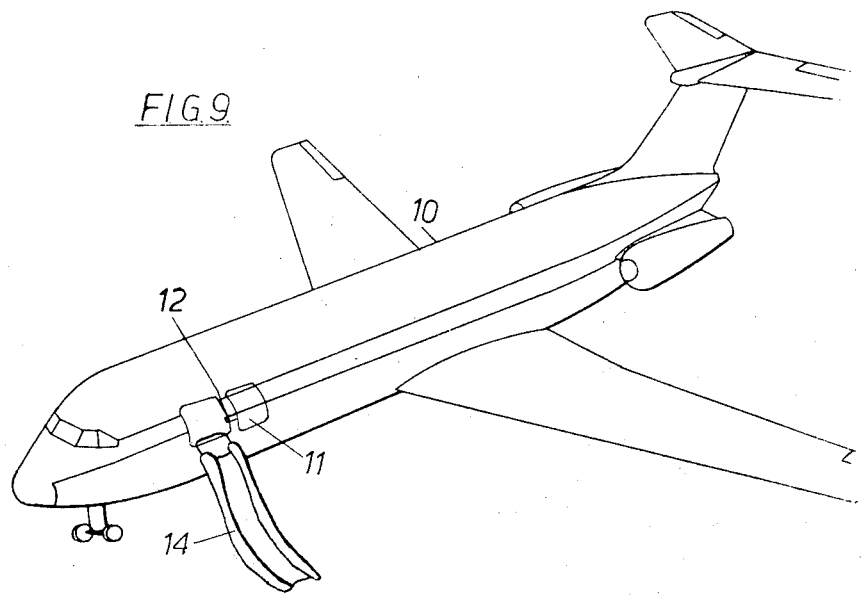
FIG. 9 is a perspective view of the aircraft, with the slide/life raft inflated.

The slide/life raft 14 (FIGS. 6 and 7) is made of synthetic rubber, and is attached to one end of a girt strap 15, the other end of which carries a girt bar 16. The girt bar 16 can be loosely mounted in an aperture 17 on the exterior of the container 13. This is the inoperative condition, used during normal loading or unloading. The girt bar 16 can be removed from the aperture 17 and fastened to the floor 18 inside the fuselage to prepare the slide/life raft 14 for its possible operation. The container 13 is attached to a horizontally slidable carriage 19 by a known type of releasable fastening 20, e.g. as used for bomb hooks, as shown diagrammatically in FIG. 10.

The carriage 19 comprises two arms 19a and 19b having lugs 19c, 19d at their ends in which are mounted recirculating ball bearing bushes 25. The carriage 19 is mounted on a support 21 which comprises two shafts 22 and 23 extending parallel to the door 11. The shaft 22 is fixed to a boss 24a on the lower end of a bracket 24. The shaft 23 is carried by arms attached to the shaft 22, which has considerable torsional strength.

The bracket is an adjunct of the door mounting arrangements, which are of a known kind, illustrated diagrammatically in FIGS. 8, 11 and 12. The bracket is hinged to the hinge arm 12, by means of a hinge pin 46, about a substantially vertical axis 44, and the door 11 is coupled to the bracket by two links, one shown at 24b. These links may permit the door to be shifted vertically a small distance relatively to the bracket to enable the door to be locked in the closed position. This provision for locking will not be described in detail, as it is no part of the present invention. The total weight of the bracket 24 and the escape slide are taken by the hinge arm 12 and not by the door structure, but the shafts 22, 23 remain parallel to the door at all times, and remain at a substantially constant distance inboard of it. The second shaft 23 carries the carriage 19 for horizontal sliding movement parallel to the door 11 on the two recirculating ball bearing bushes 25. Further support is given to the carriage by two rollers 26 (FIG. 5) mounted on lugs 27a on the outboard edge of the carriage 19 and running in a track 27 mounted on the bottom of the shaft 22. The virtue of the system of two shafts 22, 23, bushes 25, rollers 26 and track 27 is that it is the most efficient method of mounting the carriage to the door and also the easiest method for sliding the carriage in a horizontal direction. The rollers 26 and the track 27 act as a stabilizing means which prevents the container 13 from coming into contact with the interior surface of the door.

Figure 3:
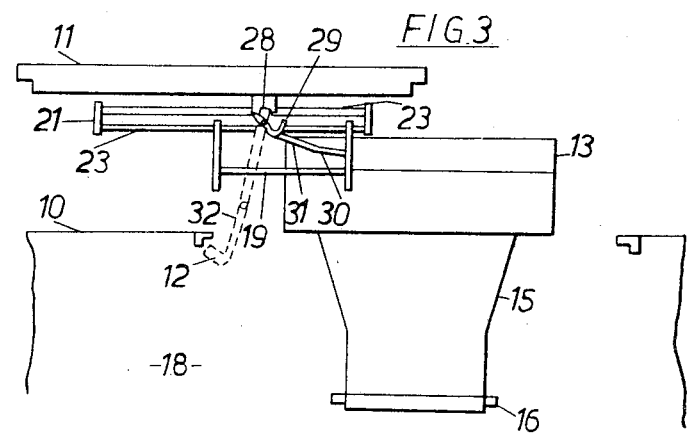
FIG. 3 is a plan view, viewed from arrow III on FIG. 2.

The carriage is constrained as to its position relative to the door by the following mechanism. A cam roller 28 mounted on the bottom of the hinge arm 12 engages in a cam track 29 pivotally mounted on the bracket 24 at a point 29a. When the door 11 is opened, the cam roller 28 drives the cam track 29, causing it to rotate, anticlockwise as seen in FIG. 1. A rod 30 connected between an arm 31 extending from the cam track 29 and the carriage 19 moves the carriage sideways on the bearings 25 and rollers 26. The sideways movement is determined by the angle through which the door 11 is opened. The movement ensures that the container 13, while moving outwards with the door, remains in register with the door aperture until it is clear of the doorway surround structure 10. The anticlockwise movement of the cam track as the mechanism moves from the position of FIG. 1 to the position of FIGS. 3 and 5 is due to the shape of the part of the track then engaged by the roller 28. As the mechanism moves on, to the fully-open position of FIG. 6, the roller reaches a further part of the track so shaped that the cam track swings back clockwise, as seen from above. In consequence, the container 13 then moves sideways relative to the door aperture to follow and catch up the door. These movements are reversed during closing of the door.

A second cam roller 32 on the bottom of the hinge arm 12 locates in a slot 33 on the lug 19c of the carriage 19 (FIG. 1). This provides a guide during the initial stages of opening and the final stages of closing the door, as well as transferring fore-and-aft "G" loads from the carriage structure 19 to the hinge arm 12.

Air bottles 47 (FIG. 8), which constitute a reservoir of compressed gas for inflating the slide/life raft 14, are mounted remote from the container 13, and are coupled by a fixed pipe 48 to a flexible hose 49 at the door end, and then to the slide/life raft 14. Discharge of the air bottles is controlled by two cables 50 and 51 one of which is actuated by the container dropping from the carriage 19, and the other by a toggle between the hinge 12 and the door when it reaches its fully-open position.

The releasable fastening 20 is released by means of a cable 52 (FIGS. 5 and 10) attached to the girt strap 15. Thereupon the container 13 falls from the carriage. As it falls, a cable 34 (FIG. 1), attached to an arm 19e on the carriage 19 and to a bellcrank mechanism 35 pivotally mounted on the container 13, withdraws two shear pins 36 and 37, enabling the end panels of the container 13 to hinge outwards about hinges 38 and 39 under normal expansion tendency of the slide/life raft 14, thus breaking a final shear stud 53 (FIGS. 1 and 13), whereupon the rest of the container can unfold about hinges 40, 41, 42 and 43.

In operation, the door 11 is closed when all the passengers have boarded the aircraft, the girt bar 16 is removed from the aperture 17, and is fastened to the aircraft floor 18 by engaging brackets 54 (FIG. 5) so that the slide/life raft 14 is in a prepared condition for possible operation.

When the door 11 is opened, the carriage 19 moves sideways under the influence of the cam track 29. This movement continues, keeping the container 13 in the door aperture until the door 11 has moved sufficiently far out from the door surround structure 10 for the container 13 to be clear of the aircraft floor 18. At this point the container 13 is released from the carriage 19 by the releasable fastening 20 actuated by the cable attached to the girt strap 15. The shear pins 36 and 37 are pulled out by the bellcrank 35 and the slide/life raft 14 is inflated. The door continues to open and the carriage 19 is withdrawn back into its original position adjacent the door when it is fully open, so as not to obstruct the exit. Passengers can then slide down the inflated slide/life raft 14.

It is necessary that people outside the aircraft should not be confronted by a self-inflating slide if they open the door from the outside for rescue purposes. For this reason there is an arrangement (not shown) whereby, if they open the door from outside the aircraft when the girt bar is secured to the floor, the container is only dropped from the carriage but will not inflate.

If no emergency arises during the flight, the girt bar 16 is removed from the aircraft floor 18, and placed back in the aperture 17 at the end of the flight, and the door can then be opened without the slide/life raft 14 being in any way affected, although the container 13 will move in unison with the carriage. When the door is "fully opened" it is in the usual position relative to the fuselage. The container is so designed that it will fit between the door and the fuselage. The movement of the door is limited by a spring-loaded plunger (not shown) mounted on the hinge arm, which locates with a bracket positioned on the interior surface of the door, when the door is fully open. To close the door, the plunger is lifted clear of the bracket and the door swung back into place. The carriage 19 and the container 13 then return to the position shown in FIG. 1.

Preferably, as in the above example, the container is secured to the carriage by a releasable attachment, there is automatic means for releasing the attachment when the door is opened, provided the end of the slide is anchored adjacent to the sill, and there is means for causing the container to open and release the slide upon release of the container from the carriage. Other arrangements are possible; for example the container may be designed so as to open while remaining attached to the carriage. Then the slide falls from the container.

Preferably, as in the above example, the escape slide is inflatable, and there is a compressed gas supply connected to the escape slide through automatic means responsive to the release of the escape slide from the container.

What I claim is:

1. An aircraft including an external door carried by a parallel linkage, whereby the door can move bodily relatively to a door aperture, outwards and to one side from closed position to open position, and vice versa, a support also carried by the parallel linkage, a carriage movable on the support, a container secured to the carriage, an escape slide stowed within the container and having an end with means for detachable anchorage adjacent to the sill of the door aperture, and means constraining the carriage relatively to the door, whereby when the door is closed the container lies adjacent to the interior of the door, and during the first part of each opening movement of the door the carriage is so shifted on the support that the container remains in register with the door aperture as it moves through the aperture, and during a second part of each opening movement of the door the carriage is shifted in a reverse direction on the support.

2. An aircraft according to claim 1, wherein the door is connected to the parallel linkage by a bracket, and the support consists of two parallel shafts fixed to the bracket, the carriage including a sleeve sliding on one of the shafts and a guide roller riding on a track on the other shaft.

3. An aircraft according to claim 2, wherein the means constraining the carriage includes a cam track pivoted on the bracket, engaged by a cam roller carried by the parallel linkage, there being a link between the cam track and the carriage.

4. An aircraft according to claim 1, wherein the container is secured to the carriage by a releasable attachment, there is automatic means for releasing the attachment when the door is opened, provided the end of the slide is anchored adjacent to the sill, and there is means for causing the container to open and release the slide upon release of the container from the carriage.

5. An aircraft according to claim 1, wherein the escape slide is inflatable, and including a compressed gas supply connected to the escape slide through automatic means responsive to the release of the escape slide from the container.

* * * * *